US006568072B2

(12) United States Patent
Wilemon et al.

(10) Patent No.: US 6,568,072 B2
(45) Date of Patent: May 27, 2003

(54) REINFORCED UTILITY CABLE AND METHOD FOR PRODUCING THE SAME

(76) Inventors: Jerry W. Wilemon, 194 Road 209, Burnsville, MS (US) 38833; Rudolph P. Suto, 125 W. Larkspur, Munhall, PA (US) 15120; Forrest F. Stacy, 1948 Harbour Oak Dr., Snellville, GA (US) 30078

( * ) Notice: Subject to any disclaimer, the term of this patent is extended or adjusted under 35 U.S.C. 154(b) by 0 days.

(21) Appl. No.: 10/172,070

(22) Filed: Jun. 13, 2002

(65) Prior Publication Data

US 2003/0006056 A1 Jan. 9, 2003

Related U.S. Application Data

(63) Continuation-in-part of application No. 09/881,311, filed on Jun. 13, 2001, now Pat. No. 6,513,234.

(51) Int. Cl.[7] .......... B29D 11/00

(52) U.S. Cl. .......... 29/825; 156/180

(58) Field of Search .......... 29/825, 828, 829, 29/33 F, 745, 779, 728; 156/180

(56) References Cited

U.S. PATENT DOCUMENTS 4,211,591 A * 7/1980 Stiles .......... 156/83

* cited by examiner

*Primary Examiner*—Edward K. Look
*Assistant Examiner*—Dwayne J. White
(74) *Attorney, Agent, or Firm*—Clifford A. Poff

(57) ABSTRACT

A method and apparatus for producing a reinforce a conductor of a utility transmission line is provided by selecting an electrical or communication conductor for a desired utility, selecting a plurality of strands of filaments to mechanically reinforce the utility transmission line, selecting a polymer treated with a catalyst to encase the strands of filament and the transmission line, pulling the strands of filament and the transmission line encased in the treated polymer through an elongated protrusion die to form an electrically insulated and reinforced utility cable, maintaining an elevated temperature gradient along the die to control the physical property of the polymer as the polymer catalyze, bending the cable in reversed directions after emerging from the protrusion die during completion of the catalyzing and during cooling to ambient temperature to avoid the occurrence of a permanent set in the catalyzed polymer, and coiling the newly formed electrically insulated and reinforced utility cable.

13 Claims, 7 Drawing Sheets

REINFORCED UTILITY CABLE AND METHOD FOR PRODUCING THE SAME

CROSS REFERENCE TO RELATED APPLICATIONS

This application is a continuation in part of application Ser. No. 09/881,311, filed Jun. 13, 2001, now U.S. Pat. No. 6,513,234

BACKGROUND OF THE INVENTION

1. Field of the Invention

This invention relates to a method to manufacture a composite reinforced utility conductor for use in aerial, underground and underwater transmission, distribution and service for electrical and communication utilities, and more particularly, to a reinforced utility cable and a method and an apparatus for producing such a cable by molding and hardening a polymer embedded with continuous filaments or tape in a thermally controlled protrusion die.

2. The Prior Art

The metal used for electrical conductors is selected for the desired electrical properties but the metal is structurally weak in terms of the strength needed for suspending the conductor as an electric transmission line and also for withstanding the forces imposed by wind and ice. To overcome this problem, the electric transmission line is made by wrapping several electrical conductors around a strong steel core. The steel reinforced conductors attached to poles or towers are exposed to the elements using the atmosphere for insulation between transmission lines.

Pultrusion is a well known method for processing material to form a finished product having a desired cross sectional dimension and physical properties imparted by pulling the product along a converging surface of an elongated die. The pultrusion method is used according to the present invention for a cost effective process to apply insulation material and if desired a semi-conducting coating to aluminum or a copper electrical conductor or a light guide cable and controlling sensible heat occurring during the catalyzing action of the polymer in the die. Embedded in the insulation material during passage through the protrusion die are stands of filament and additionally in a light die cable, one or more strands of tape impart the desired strength.

It is an object of the present invention to provide a reinforced utility cable enveloped in a mass of catalyzing polymer which is molded and hardened in an elongated die wherein the temperature is incrementally varied along the length of the die.

It is a further object of the present invention to provide a manufacturing process and apparatus for a reinforced utility cable including passing a molded and hardened fiber reinforced utility cable through a looper to work the cable at ambient temperature by repeated reverse bending prior to coiling.

It is another object of the present invention to provide a reinforcing utility cable and a method and apparatus for producing the same characterized by one or more strands of fiber of tape in a catalyzed polymer encased within a catalyzed polymer containing carbon fiber to form an electromagnetic shield, which is in turn encased with a catalyzed polymer.

SUMMARY OF THE INVENTION

In accordance with the present invention there is provided a method apparatus for manufacturing a composite reinforced utility cable by selecting an utility conductor with an applied grease like film that may contain micronized carbon and then compressing reinforcing filaments which have been coated with epoxy, polyurethane, or similar polymers followed by passing the newly formed bundle through a heated die. The selected polymer is preferably dicyclopentadiene and a catalyst may be introduced into the die along with the bundle consisting of the utility conductor and reinforcing filaments, and controlling the die temperature to control the exothermic catalytic reaction, thus producing a composite reinforced, insulated conductor of sufficient mechanical strength to withstand aerial installation, and with sufficient dielectric strength to allow for close spacing of the electrical conductors to overcome induction problems when transmission lines constructed parallel metallic structures such a natural gas lines in a utility corridor, and overcoming problems of short circuit arcing to trees in narrow rights-of-way.

Additionally, a high voltage underground or coaxial cable can be made by passing the composite reinforced conductor previously described through a second process by compressing carbon fibers and conductors which been previously dipped in epoxy or polyurethane, or similar material, around the composite reinforced conductor or introducing dicyclopentadiene and a catalysis to the composite reinforced conductor when the newly formed bundle is again forced through a thermally controlled die. The carbon fiber containing conductors functions as an electromagnetic shield as in axial cables and provides a test point for monitoring current leakage to forecast failure in high voltage cable in subterranean placement sites. A third pass through a thermally controlled die is used to apply an outer layer of only a catalyzed polymer to cable used in coaxial and high voltage underground applications.

More particularly according to the present invention there is provided an apparatus for forming a sheathed utility cable including the combination of an applicator for applying a mass of a catalyzed polymer to a utility conductor and plurality of strands of reinforcing filaments, a protrusion die having an elongated continuous flow space for passage of bundle consisting of a caterized polymer, utility conductor and reinforcement filaments discharged from an applicator, a sleeve surrounding said protrusion die for forming an annular chamber there between, a plurality of closure members at spaced apart locations along an annular chamber for forming discrete chambers for passage of a fluid medium, inlet and outlet conduits connecting to each of the discrete chambers for passage of a fluid medium, a controller for a fluid medium passing to each of the discrete chambers for maintaining a predetermined thermal gradient along the protrusion die, and a driven puller for continuously advancing a bundle from the die.

The present invention also provides a method to reinforce a conductor of a utility transmission line, the method including the steps of selecting a transmission line for a desired utility, selecting a plurality of strands of filaments to mechanically reinforce the utility transmission line, selecting a polymer treated with a catalyst to encase the strands of filament and the transmission line, pulling the strands of filament and the transmission line encased in the treated polymer through an elongated protrusion die to form an electrically insulated and reinforced utility cable, maintaining an elevated temperature gradient along the die to control the physical property of the polymer as the polymer catalyze, bending the polymer in reversed directions after emerging from the protrusion die during completion of the catalyzing and during cooling to ambient temperature to avoid the occurrence of a permanent set in the catalyzed polymer, and coiling the newly formed electrically insulated and reinforced utility cable.

The present invention includes the combination of a reinforced utility cable including the combination of strands of a utility conductor collected in a bundle formation, a coating of grease on the strands in the bundle of strands and a coating of lubricant on the outer periphery of the bundle of strands, at least one reinforcing ribbon arranged substantially about the grease coated bundle of strands, and a sheathing of catalyzed polymer enveloping the reinforcing strand of utility conductors.

BRIEF DESCRIPTION OF THE DRAWINGS

These features and advantages of the present invention as well as others will be more fully understood when the following description is read in light of the accompanying drawings in which.

DETAILED DESCRIPTION OF THE INVENTION

Figure 1:
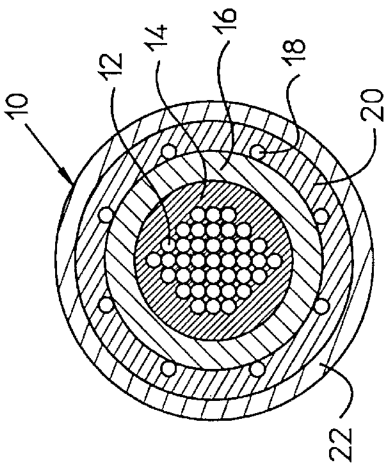
FIG. 1 is a cross-sectional view of a first embodiment of the present invention providing an electrical utility cable suitable for coaxial and underground transmission of current at a high voltage level.

In FIG. 1 there is illustrated a reinforced utility cable 10 for high voltage electric current and includes a multiplicity of individual electrical conductors 12 collected into a bundle formation as illustrated and surrounded by a blended layer 14 of carbon and grease. The layer 14 is used to prevent adhesion between the conductors 12 when enveloped in a catalyzed polymer. A reinforcement layer 16 consists of a plurality of continuous strands of filament and a catalyzed polymer. Carbon fibers (not shown) and conductors 18 are contained in an overlying layer of catalyzed polymer 20. An outer sheathing 22 consists of a catalyzed polymer is applied for imparting high quality electrical insulation. It is to be understood that it is within the scope of the present invention to provide an electrical utility cable without the outer sheathing 22 and the layer of catalyzed polymer 20 including the carbon fibers and conductors therein.

Figure 2:
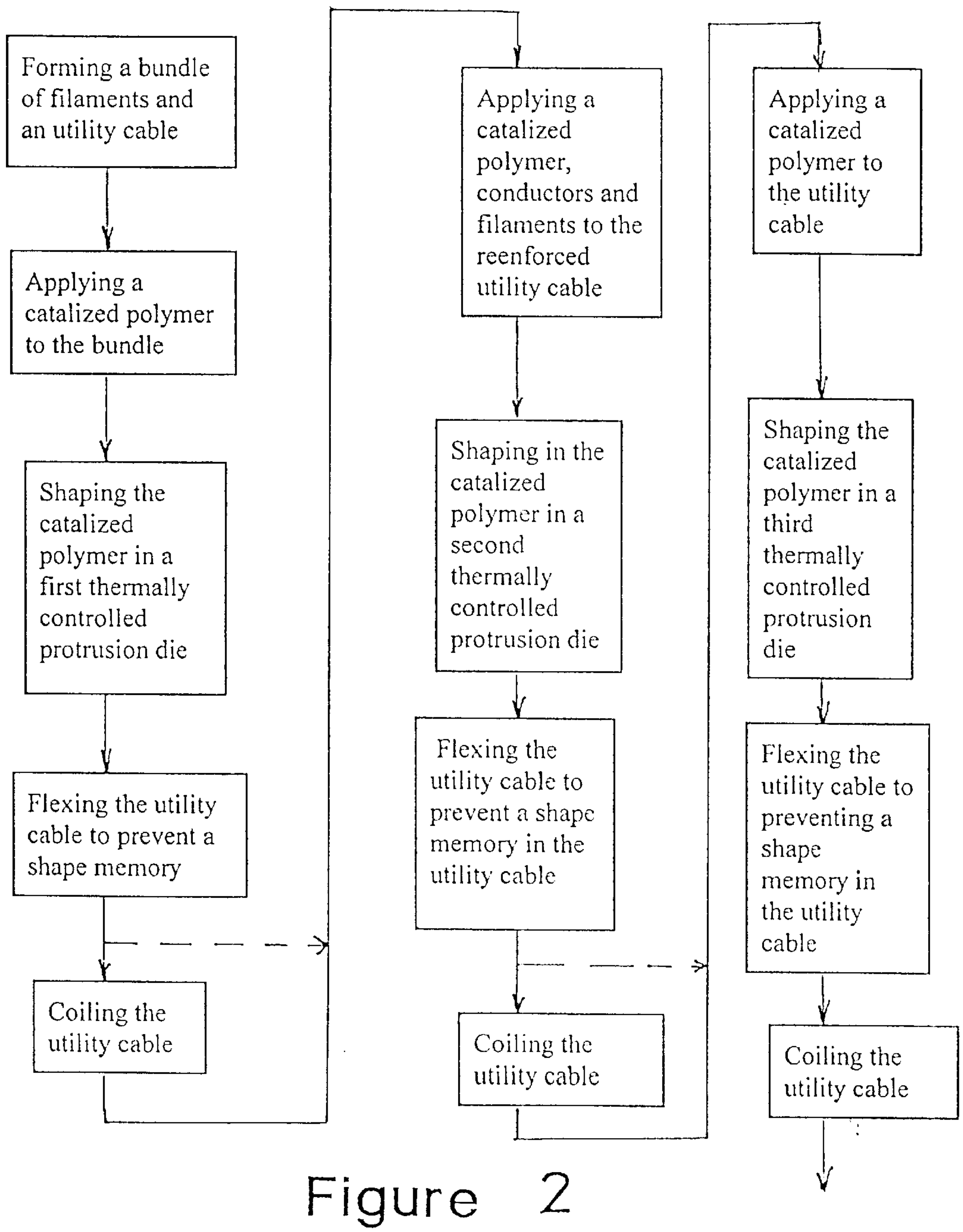
FIG. 2 is a flow diagram illustrating the process for forming the utility cable shown in FIG. 1.

The method for forming the cable shown in FIG. 1 is illustrated in the flow diagram of FIG. 2 and includes forming a bundle of filaments disbursed about the outer periphery of electrical conductors coated with grease containing micronized carbon. A catalyzed polymer is then added to the bundle and then the bundle and polymer are drawn through a thermally controlled protrusion die to control the catalyzing process and establish the cross sectional shape of the utility cable. The cable is then flexed in reversing directions while the catalyzing process is completed to avoid the formation of set shape due to the coiled configuration on a storage reel. With or without the coiling of the cable, the processing of the cable is continued by again applying a catalyzed polymer containing carbon fibers to the outer surface of the cable while conductors are distributed about the cable surface. A second thermally controlled protrusion die is used to control the catalyzing process and establish the new cross sectional shape for the utility cable. The cable is again flexed in reversing directions while the catalyzing process is completed to avoid the formation of set shape when coiled. And again with or without the coiling of the cable, the processing is continued by applying only catalyzed polymer to the outer surface of the cable and using a third thermally controlled protrusion die to control the catalyzing process and establish the final cross sectional shape for the utility cable. The cable is again flexed in reversing directions while the catalyzing process is completed to avoid the formation of set shape and then the utility cable is coiled for shipment.

Figure 3:
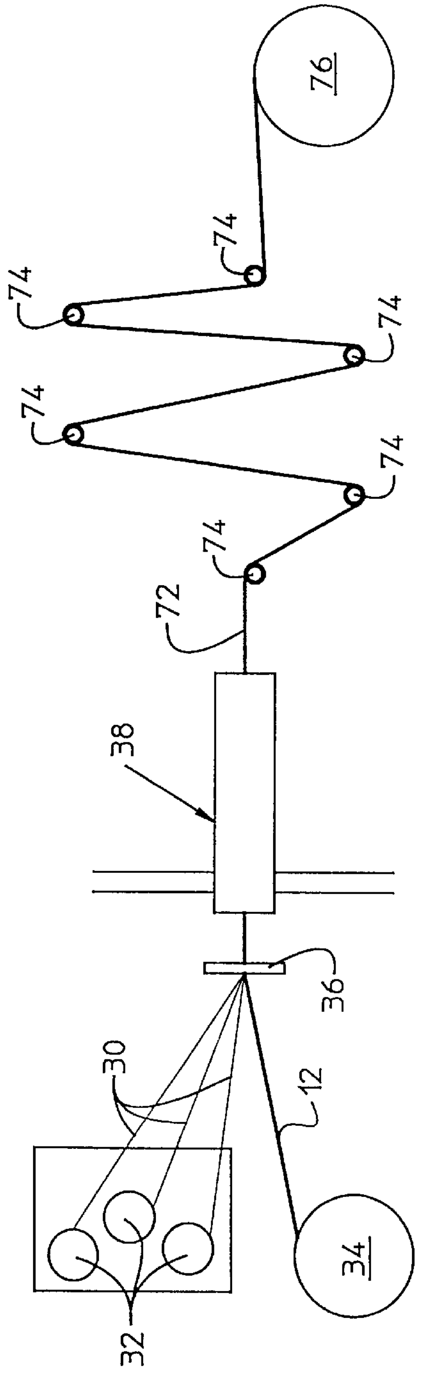
FIG. 3 is a schematic illustration of a processing line to form a utility cable according to one embodiment of the present invention.

Referring to FIG. 3, there is illustrated the preferred embodiment of apparatus for forming a continuous pultruded utility cable according to the present invention. Multiple strands of continuous fibers 30, such as Kevlar, for example, are drawn from storage creels 32, and are distributed about the bundle of electrical conductors 12 which are coated with the mixture of carbon and grease and pulled from a storage reel 34. The fibers 30 have been previously mechanically or chemically abraded in order to enhance adherence of the fiber with a polymer. The fibers 30 are disbursed about the bundle of conductors 12 by passage through apertures in a comb 36 arranged to organize the fibers about the periphery. The conductors 12 and the abraded fibers 30 emerging from the comb pass into a protrusion die 38 where the entrance portion contains orifices for the introduction of a polymer and a catalyst. According to the embodiment of FIG. 3 there is a resin preferably cyclopentadiene and a catalyst such as ruthenium dichloride. The reaction becomes exothermic due to ring open metathesis polymerization. The reaction is relative slow and therefore a relatively long protrusion die is provided to allow the polymer to gel before emerging from the die.

Figure 4:
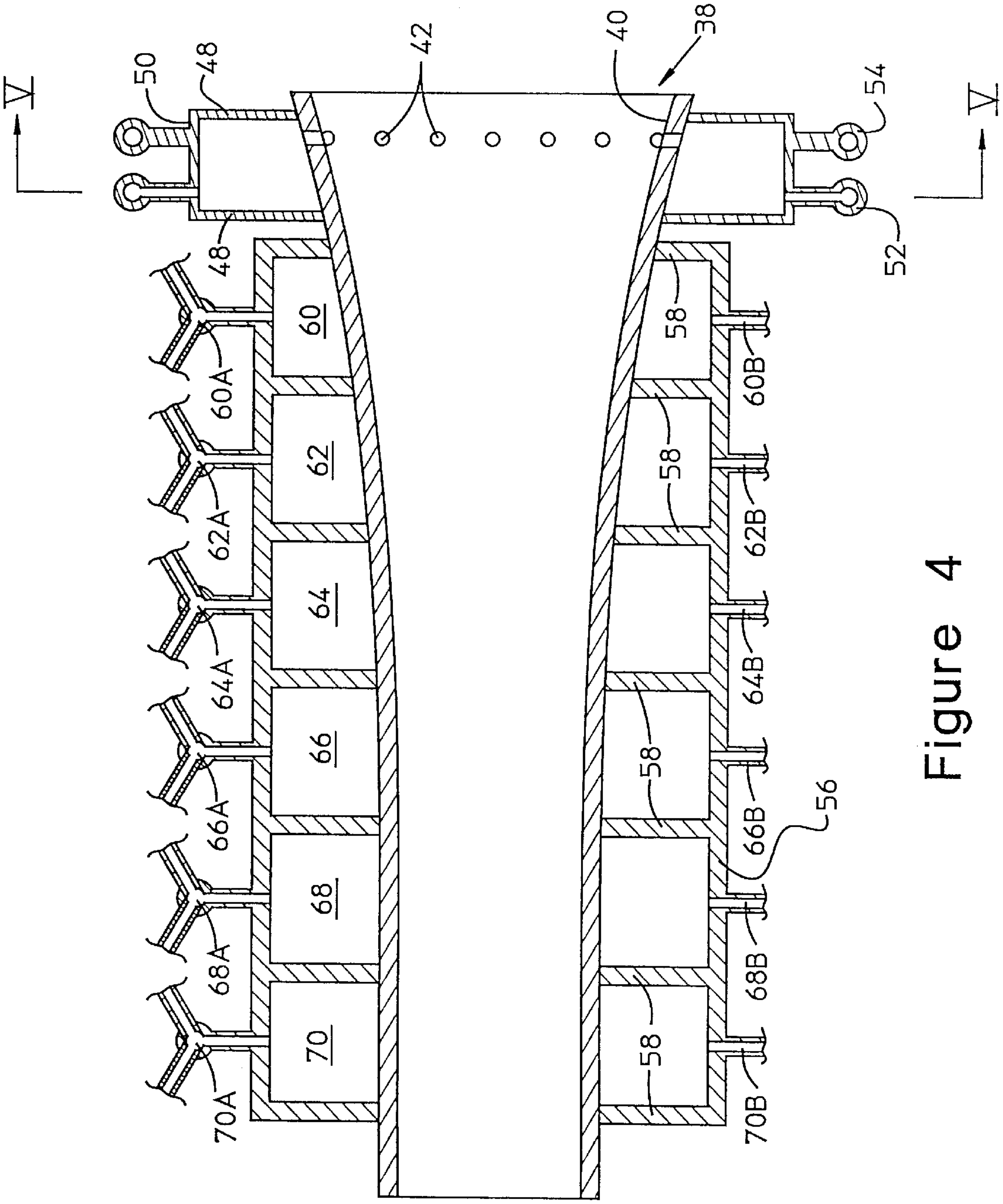
FIG. 4 is an enlarged longitudinal sectional view illustrating a protrusion die incorporated in the processing line shown in FIG. 3.

The details of the construction of the protrusion die are illustrated in FIG. 4 and include a tubular die 40 having an internal passageway resembling the shape of a venturi. At the entrance portion of the die there are arranged flow control orifices 42 lying within a plane and communicating with side-by-side chambers 44 and 46. These chambers are formed by partition walls 44 extending between side and end walls 48 and 50, respectively. The chambers 44 and 46 communicate with manifolds 52 and 54 respectively by supply pipes. Manifold 52 supplies cyclopentadiene and manifold 54 supplies ruthenium dichloride. The chemical reaction being exothermic commence at a temperature in the range of 80° to 120° F. quickly reaching a temperature of about 360° F. depending on the ratio of the catalyst to the polymer. The temperature is controlled incrementally along the length of the die by arranging a manifold tube 56 exteriorly along the die with internal partitioning walls 58 subdividing the cavity into manifold chambers 60–70. The manifold chambers 60–70 are connected by supply pipes extending to thermostatic mixing valves 60A–70A, respectively, having entrance ports coupled to supplies of chilled water and hot water. The manifold chambers 60–70 are each connected to drain lines 60B–70B, respectively. The thermostatic mixing valves induce a temperature gradient commencing at a maximum temperature of about 360° F. at the die wall joined with manifold chamber 60 by the introduction of relatively hot water as compared with the water introduced to successive manifold chambers.

Figure 5:
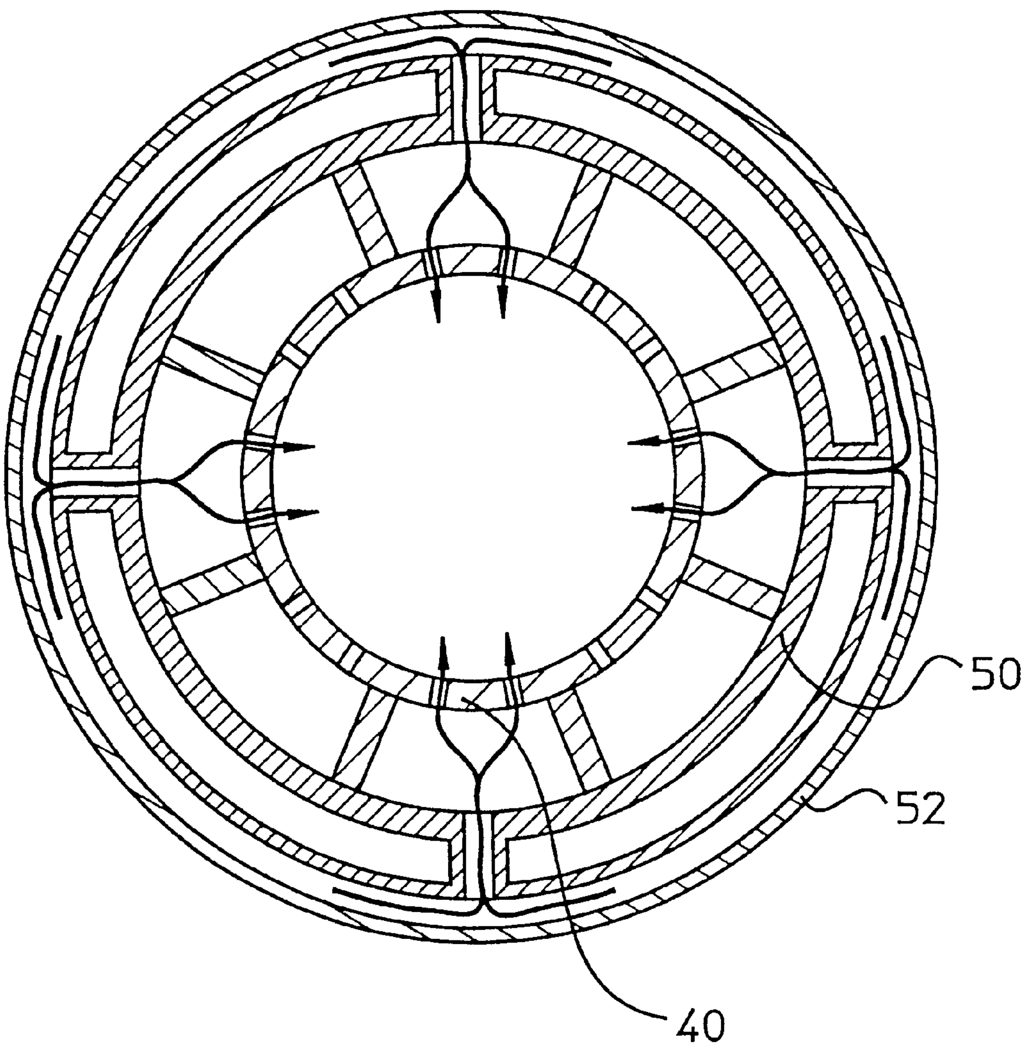
FIG. 5 is a sectional view taken along lines V—V of FIG. 4.

The molded utility cable 72 emerging from the die 38 is passed between spaced apart lopper rolls 74 in a zigzag fashion to repeatedly flex the cable and avoid the formation of a memory or set that might occur when the cable is stored in coiled form. The looper rolls 74 are driven and additionally served functions of pullers to advance the cable from the protrusion die. The cable is then either coiled on a reel 76 without further processing or past on for further processing with or without coiling. Continued processing is accomplished in second and third protrusion dies embodying the same construction as shown in FIGS. 4 and 5 but with the die surface having the same venturing shape enlarged to process the additional layers of polymer. The continued processing is by the application of a catalyzed polymer, conductors and filaments as explained hereinbefore and illustrated in FIG. 2.

Figure 6:
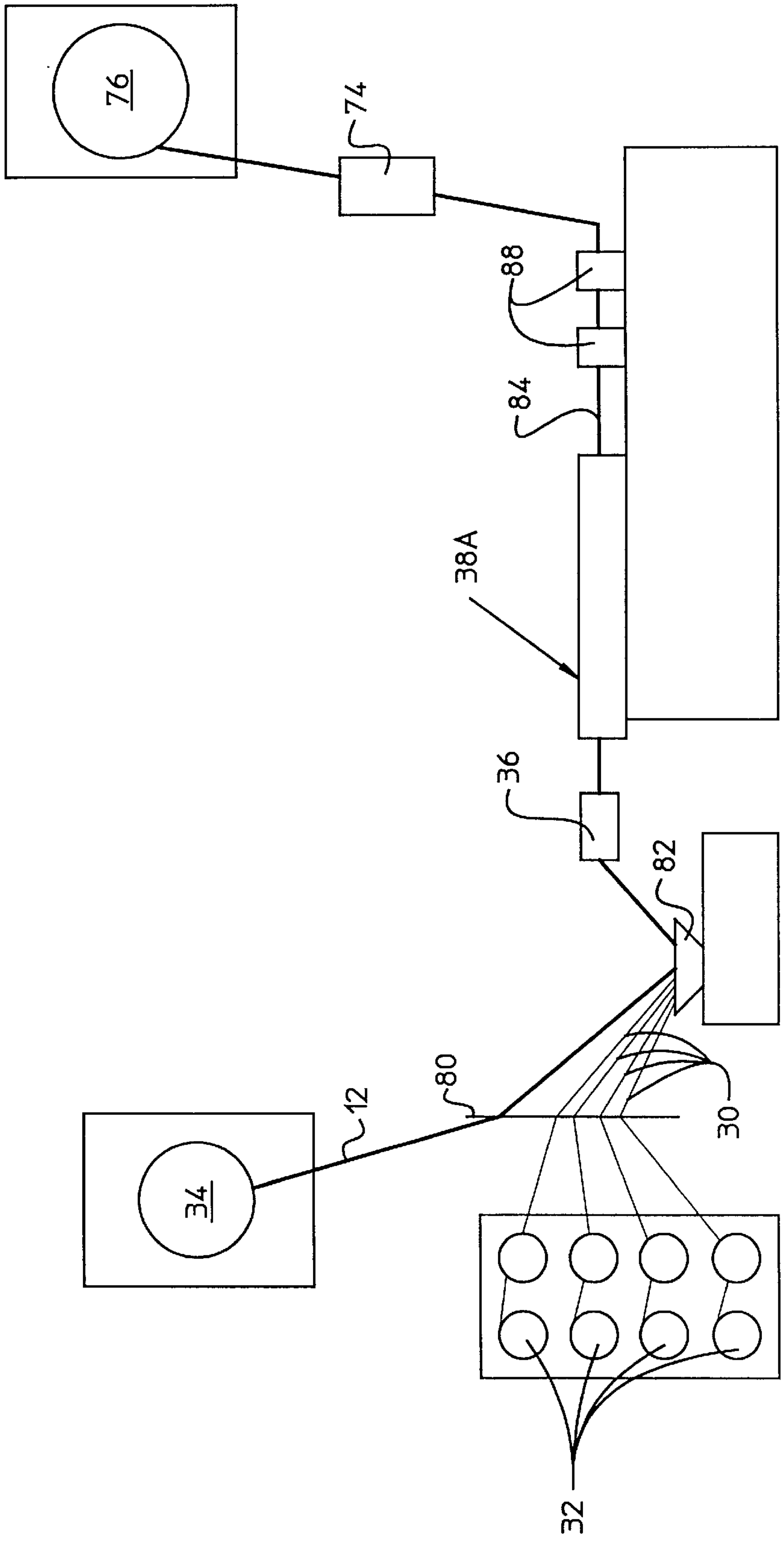
FIG. 6 is a schematic illustration of a processing line to form a utility cable according to a second embodiment of the present invention.

A second embodiment of the present invention is illustrated in FIG. 6 and differs from the first embodiment by the provision of apparatus for the use of a thermosetting resin, which requires the addition of heat for initiating the catalytic reaction to harden the resin. Multiple strands of abraded continuous fibers 30, such as Kevlar, for example, are drawn from the storage creels 32, and are distributed about the bundle of the electrical conductors 12 which are coated with the mixture of carbon and grease and pulled from the storage reel 34. The fibers 30 and the bundle of conductors are disbursed by a comb 80 for individual submersion in a vessel 82 containing a catalyzed polymer preferably a heat setting epoxy. The fibers 30 are then disbursed about the bundle of conductors 12 by passage through the apertures in a comb 36. The conductors 12 and the abraded fibers 30 emerging from the comb pass into a protrusion die 38A which is the same as protrusion die 38 with exception that the entrance portion does not contain orifices for the introduction of a polymer and a catalyst. The endothermic reaction in the die 38A is accomplished by the heat supplied by the hot water controlled by the thermostatic mixing valves 60A–70A to allow the polymer to gel before emerging from the die. The molded utility cable 82 emerging from the die 38A extends through spaced apart pullers 86 and 88 used to pull the molded utility cable through the die 38A and then passed between spaced apart lopper rolls 74 in a zigzag fashion to repeatedly flex the cable and avoid the formation of a memory or set that might occur when the cable is stored in coiled form. As in the first embodiment, the cable is then either coiled on a reel 76 or continuously processed by the application of a catalyzed polymer, conductors and filaments as explained hereinbefore and 1.

Figure 7:
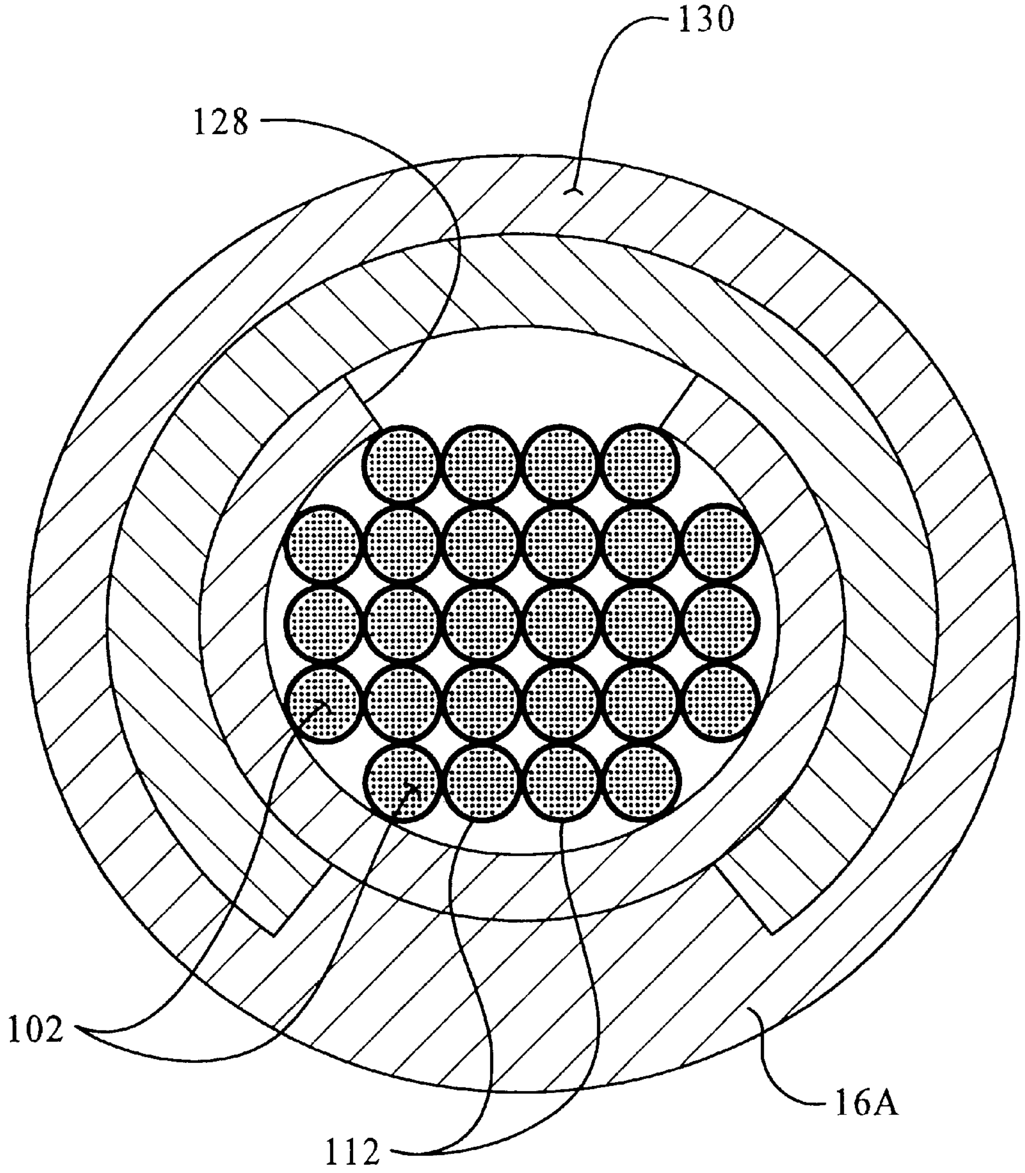
FIG. 7 is an enlarged cross-sectional view of a third embodiment of the present invention providing optical fiber transmission lines in a reinforced utility cable.
Figure 8:
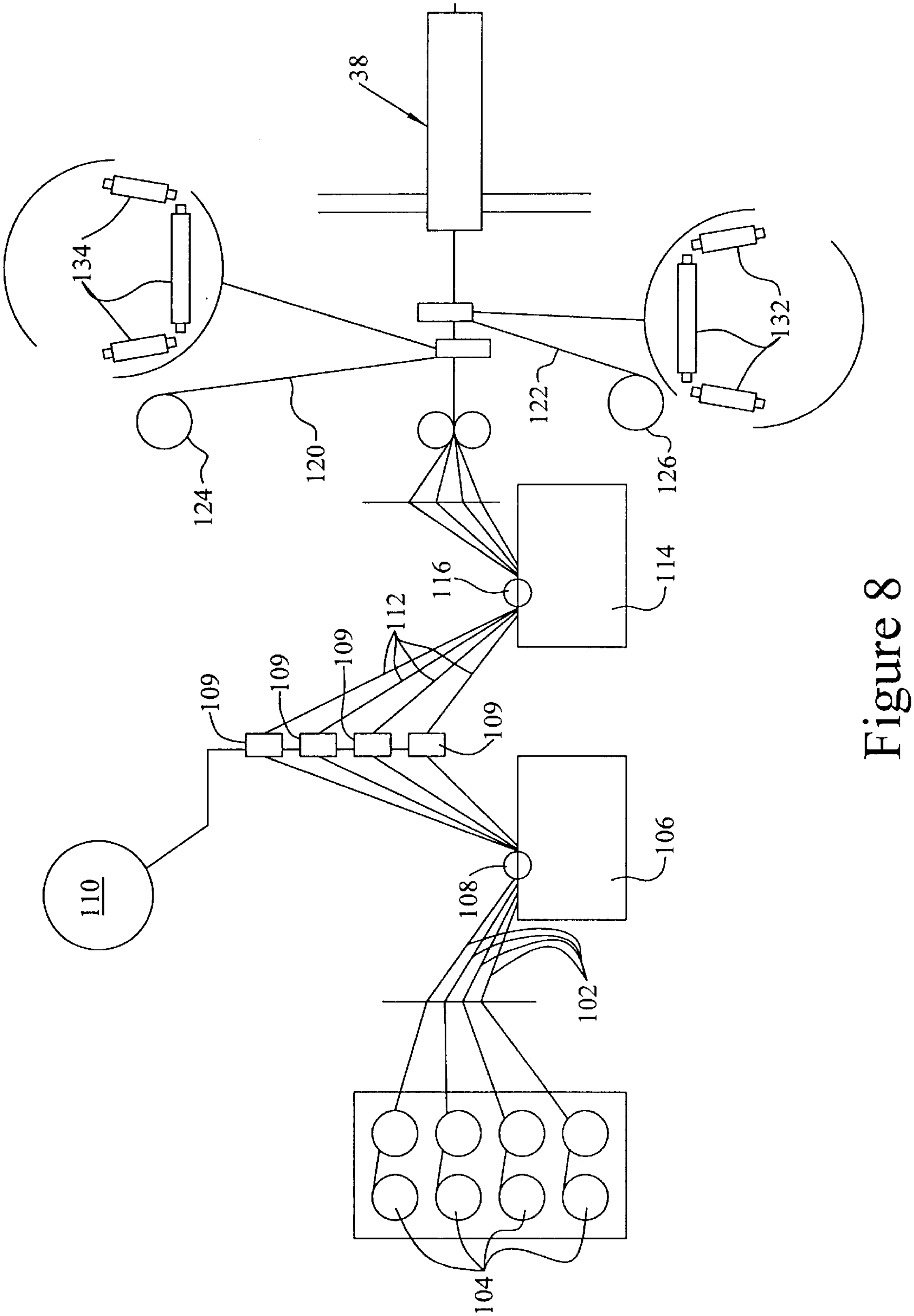
FIG. 8 is a flow diagram illustrating the process for forming the reinforced utility cable of FIG. 7.

FIGS. 7 and 8 illustrates a third embodiment of reinforced utility cable which features the use of light guide optical cables 102 feed from storage reels 104 to a tank 106 provided with a roller 108 to immerse the cable in a bath of grease or dry lubricants in a vessel and provide an adhered coating of lubricant on the cable. Examples of such lubricants are silicon and graphite. The stands of the optical cables 102 are collected into bundle formations with each bundle typical containing 12 optical cables and the bundle introduced into one of a plurality of a discrete die 109 connected to a supply of moldable plastic material 110, such as a polyvinyl resin or compound (preferably polyvinyl chloride) and produces a continuous discrete buffer tube 112. The discrete buffer tubes 112 are then collected into a bundle configuration after passage through a second bath of grease or dry lubricant in a tank 114 beneath an immersion roller 116 and thence comb 118 to arrange the buffer tubes 112 into the bundle configuration as shown in FIG. 7. The configuration of the bundle of buffer tubes is preferably symmetrical about the longitudinal axis of the bundle and some of the buffer tubes may be empty but included to symmetrical disperse the cables 102 about a geometrical center of gravity. Unlike the first and second embodiments, the third embodiment provides that a ribbon of reinforcement material such as Kevlar or similar reinforcement tape is combined with the bundle of buffer tubes to provide reinforcement. According to the preferred embodiment of FIGS. 7 and 8, there is delivered two ribbons 120 and 122 from spools 124 and 126 respectively to an inner and outer ribbon shaping assemblies 128 and 130 having a "C" shaped configuration produced by a corresponding arrangement of guide rollers 132 and 134 respectively. The arraignment of guide rollers 132 is inverted with respect to the arraignment of guide rollers 134. The guide rollers 132 and 134 alter the physical shape of the ribbons 120 and 122 so that an inner ribbon 128 envelopes about 70% of the inner periphery of the bundle and thereafter an outer ribbon 130 envelopes about 70% the outer periphery of bundle but applied at a side opposite to the side of the bundle where the inner ribbon 128 was applied. Thereafter, a reinforcement layer 16A is added to the ribbon incased bundle by the introduction of a plurality of continuous strands of filament which are imbedded in a catalyzed polymer introduced in the entrance area to the protrusion die 38. The composition the resin and the filter filaments are added as a layer 16A in substantially the same manner as provided by the continuous strands of filaments in the reinforcement layer 16 as shown and described in regard to FIG. 1. The layer 16A is added to mechanical strength. The bundle assembly is then advance through the protrusion die 38 for the temperature control during curing of the catalyzed polymer and the repeated flexing of the cable after delivery from the die as shown in FIGS. 3 and 6 and described hereinbefore. This optical fiber cable can be used for direct burial or suspended in air. However the cable may become the central core around which aluminum conductors are wrapped form optical power ground wire providing optical fiber for communications, lightning protection for high voltage transmission lines, and fault current return path for circuit breaker coordination. The optical fiber cable will also serve as the structural support for the aluminum conductors. The ribbons 120 and 122 can also be spiral wrapped around the bundle of buffer tubes if desired. Spiral wrapping is an easier production process, but requires more ribbon. The light guide optical fibers are contained in a loose configuration in the buffer tubes. The valued advantage of this embodiment of invention is the isolation of the optical fibers from all forces on the composite formed by the reinforcement layer 16A by the suspension in grease, powder, or similar friction reducing substance. Additionally, the placement of the optical fiber inside a hollow tube (which may take the form of a soda straw) allows the fibers to move freely inside the tube. During installation all pulling forces are applied only to the reinforcement layers 16A whereby the optical fibers are isolated from the pulling force which eliminates the most common cause of optical fiber failure, that is, excessive pulling stress during installation. An additional feature of this embodiment of the invention is the ability of the cable to conform to shorter bending radii due to the additional cushion provided by the grease suspension.

While the present invention has been described in connection with the preferred embodiments of the various figures, it is to be understood that other similar embodiments may be used or modifications and additions may be made to the described embodiments for performing the same function of the present invention without deviating there from. Therefore, the present invention should not be limited to any single embodiment, but rather construed in breadth and scope in accordance with the recitation of the appended claims.

We claim:

1. A method to reinforce a conductor of a utility transmission line, said method including the steps of:

selecting a transmission line for a desired utility wherein the transmission line selected includes a bundle of light guide cables coated with a lubricant;

selecting a plurality of strands of filaments;

dispersing the strands of filament about the transmission line in a catalyzed polymer at the entrance to a die;

pulling the selected transmission line and the strands of filaments containing a resin and catalyst through an elongated die having a length sufficient to allow an exothermic ring open metathesis polymerization of the resin;

differentially cooling the die at multiple sites along the die to control physical property the polymerized resin; and subjecting the extruded product issuing from the die to repeated reverse mechanical bending during completion of the polymerization and final cooling.

2. A method to reinforce a conductor of a utility transmission line, said method including the steps of:

selecting a transmission line for a desired utility wherein the transmission line selected includes a plurality of discrete bundles of light guide cables coated with a lubricant with each such bundle located in a discrete buffer tube collected n a bundle configuration;

selecting a plurality of strands of filaments;

dispersing the strands of filament about the transmission line in a catalyzed polymer at the entrance to a die;

pulling the selected transmission line and the strands of filaments containing a resin and catalyst through an elongated die having a length sufficient to allow an exothermic ring open metathesis polymerization of the resin;

differentially cooling the die at multiple sites along the die to control physical property of the polymerized resin; and subjecting the extruded product issuing from the die to repeated reverse mechanical bending during completion of the polymerization and final cooling.

3. The method according to claim 2 wherein said bundle configuration of discrete buffer tubes is reinforced by at least one ribbon of reinforcing material.

4. The method according to claim 3 wherein said ribbon of reinforcing material is formed with a C shaped to envelope a substantial portion of a periphery of said bundle of configuration of discrete buffer of tubes.

5. The method according to claim 4 wherein said at least one ribbon of reinforcing material comprises two ribbons of reinforcing material each enveloping a substantial portion of a periphery of said bundle of configuration of discrete buffer of tubes with one ribbon overlying portion of the other ribbon.

6. The method according to claim 5 wherein the said catalyzed polymer is cyclopentadiene and wherein the selected catalyst is ruthenium bichloride.

7. A reinforced utility cable including the combination of:

strands of a utility conductor collected in a bundle formation;

a coating of grease on the strands in said bundle of strands and a coating of lubricant on the outer periphery of said bundle of strands;

at least one reinforcing ribbon arranged substantially about the grease coated bundle of strands; and a sheathing of catalyzed polymer enveloping the reinforcing strand of utility conductors.

8. The reinforced utility cable according to claim 7 wherein said strands of utility conductors include a bundle of light guide cables coat with a lubricant.

9. The reinforced utility cable method according to claim 7 wherein said strands of utility conductors include a plurality of discrete bundles of light guide cables coat with a lubricant with each such bundle located in a discrete buffer tube collected in a bundle configuration.

10. The method according to claim 9 further including at least one ribbon of reinforcing material at least partially enveloping said bundle configuration.

11. The reinforced utility cable method according to claim 9 wherein said ribbon of reinforcing material is formed with a C shaped to envelope a substantial portion of a periphery of said bundle of configuration of discrete buffer of tubes.

12. The reinforced utility cable method according to claim 9 further including two ribbons of reinforcing material each enveloping a substantial portion of a periphery of said bundle of configuration of discrete buffer of tubes with one ribbon overlying portion of the other ribbon.

13. The reinforced utility cable method according to claim 9 further including conductors wrapped about said sheathing of catalyzed polymer to form a power ground wire for communications and for lightning protection for high voltage transmission lines, and forming a fault current return path for circuit breaker coordination.

* * * * *